US011978078B2

(12) United States Patent
Mehrhoff et al.

(10) Patent No.: US 11,978,078 B2
(45) Date of Patent: May 7, 2024

(54) METHODS AND SYSTEMS FOR REWARDING RECYCLING OF CONTAINERS AND COLLECTING CONTAINER METRICS

(71) Applicant: MASTERCARD INTERNATIONAL INCORPORATED, Purchase, NY (US)

(72) Inventors: Shawn Mehrhoff, Saint Ann, MO (US); Christopher T. Scholl, St. Peters, MO (US)

(73) Assignee: MASTERCARD INTERNATIONAL INCORORATED, Purchase, NY (US)

( * ) Notice: Subject to any disclaimer, the term of this patent is extended or adjusted under 35 U.S.C. 154(b) by 234 days.

(21) Appl. No.: 17/138,126

(22) Filed: Dec. 30, 2020

(65) Prior Publication Data
US 2022/0207551 A1    Jun. 30, 2022

(51) Int. Cl.
*G06Q 30/00*    (2023.01)
*G06F 16/23*    (2019.01)
(Continued)

(52) U.S. Cl.
CPC ..... *G06Q 30/0208* (2013.01); *G06F 16/2379* (2019.01); *G06K 7/1413* (2013.01);
(Continued)

(58) Field of Classification Search
None
See application file for complete search history.

(56) References Cited

U.S. PATENT DOCUMENTS 3,263,847 A * 8/1966 Amann ................ B65D 1/0223
215/382
3,295,706 A * 1/1967 McMeekin ............ B65D 23/00
215/385

(Continued)

FOREIGN PATENT DOCUMENTS

| DE | 10302201 A1 * | 7/2004 | ............. G07F 7/069 |
| GB | 2431568 A * | 5/2007 | ............ B65F 1/0033 |
| WO | 2018215682 A1 | 11/2018 | |

OTHER PUBLICATIONS

David Feber et al. "Sustainability in packaging: Inside the minds of US consumers." (Oct. 21, 2020). Retrieved online Nov. 17, 2022. https://www.mckinsey.com/industries/paper-forest-products-and-packaging/our-insights/sustainability-in-packaging-inside-the-minds-of-us-consumers (Year: 2020).*

(Continued)

*Primary Examiner* — James A Reagan
(74) *Attorney, Agent, or Firm* — Armstrong Teasdale LLP

(57) ABSTRACT

Described herein is a computing system for linking products and containers to cardholders. The computing system is configured to receive transaction data associated with a transaction carried out by a cardholder, the transaction data including an account identifier associated with the cardholder, a product identifier, and a container identifier associated with a product purchased in the transaction. The computing system also links the product identifier and the container identifier to the account identifier, and stores the linked product identifier, container identifier, and account identifier. The computing system receives, from a user device, the container identifier associated with the container received by a user associated with recycling the container, determines the account identifier linked to the container identifier associated with the product received by the user, (Continued)

and automatically provides a reward to the cardholder via the account identifier.

20 Claims, 7 Drawing Sheets

(51) Int. Cl.
    *G06K 7/14*            (2006.01)
    *G06Q 10/30*           (2023.01)
    *G06Q 30/0207*        (2023.01)
    *G06Q 30/0208*        (2023.01)
    *G06Q 40/02*           (2023.01)
    *G06K 7/10*            (2006.01)
    *G06Q 20/04*           (2012.01)
    *G06Q 20/34*           (2012.01)
    *G06Q 20/36*           (2012.01)

(52) U.S. Cl.
    CPC .......... *G06K 7/1417* (2013.01); *G06Q 10/30* (2013.01); *G06Q 30/0215* (2013.01); *G06Q 40/02* (2013.01); *G06K 2007/10504* (2013.01); *G06Q 20/042* (2013.01); *G06Q 20/342* (2013.01); *G06Q 20/3678* (2013.01); *G06Q 2220/00* (2013.01)

(56) References Cited

U.S. PATENT DOCUMENTS

| | | | | |
|---|---|---|---|---|
| 4,579,216 | A * | 4/1986 | DeWoolfson | G07F 7/0609 100/902 |
| 4,624,383 | A * | 11/1986 | Moore | B65D 81/361 52/DIG. 9 |
| 5,464,108 | A * | 11/1995 | Samelson | B65D 81/36 215/400 |
| 7,317,962 | B2 | 1/2008 | Whittier | |
| 8,096,397 | B2 * | 1/2012 | Nordbryhn | G06Q 10/30 705/308 |
| 8,387,875 | B2 * | 3/2013 | Truesdale | G07F 7/06 235/383 |
| 10,106,285 | B2 * | 10/2018 | Bolhous | B65D 33/00 |
| 2007/0219862 | A1 * | 9/2007 | Casella | G06Q 30/0215 705/14.17 |
| 2007/0260466 | A1 * | 11/2007 | Casella | G06Q 10/30 705/308 |
| 2008/0093436 | A1 * | 4/2008 | Bolhous | G06Q 30/04 235/375 |
| 2008/0094224 | A1 * | 4/2008 | Parker | B65F 1/1646 340/572.8 |
| 2008/0283356 | A1 * | 11/2008 | Nordbryhn | G06Q 10/30 194/205 |
| 2008/0296374 | A1 * | 12/2008 | Gonen | B65F 1/1484 705/14.54 |
| 2009/0014363 | A1 * | 1/2009 | Gonen | G06Q 30/00 700/89 |
| 2009/0024479 | A1 * | 1/2009 | Gonen | G06Q 30/00 705/14.1 |
| 2009/0138358 | A1 | 5/2009 | Gonen et al. | |
| 2009/0313112 | A1 * | 12/2009 | Champ | G06Q 30/06 705/30 |
| 2010/0056305 | A1 * | 3/2010 | Hebert | A63B 47/00 473/409 |
| 2010/0185506 | A1 * | 7/2010 | Wolff | G06Q 30/02 707/E17.014 |
| 2010/0198671 | A1 * | 8/2010 | Prabhakar | G06Q 30/00 705/308 |
| 2011/0186623 | A1 * | 8/2011 | Truesdale | G07F 7/06 235/375 |
| 2011/0218885 | A1 * | 9/2011 | Manski | G06Q 30/0282 705/347 |
| 2011/0225098 | A1 * | 9/2011 | Wolff | G06Q 30/02 705/308 |
| 2011/0320360 | A1 * | 12/2011 | Murray | G06Q 10/00 705/308 |
| 2012/0029980 | A1 * | 2/2012 | Paz | B07C 5/34 705/14.1 |
| 2012/0029985 | A1 * | 2/2012 | Wilson | B65F 1/1426 705/308 |
| 2012/0197812 | A1 * | 8/2012 | Ishii | G06Q 10/08 705/308 |
| 2012/0209783 | A1 * | 8/2012 | Smith, Jr. | G06Q 20/384 705/308 |
| 2012/0285750 | A1 * | 11/2012 | Hynes | G01G 19/083 177/139 |
| 2013/0126380 | A1 * | 5/2013 | LoPiccolo | B65D 5/0227 221/48 |
| 2013/0191201 | A1 * | 7/2013 | Weise, III | G06Q 10/30 705/14.27 |
| 2013/0212029 | A1 * | 8/2013 | Krejci | G06Q 10/00 705/308 |
| 2014/0012765 | A1 * | 1/2014 | Kruglick | G06Q 10/1093 705/308 |
| 2014/0199508 | A1 * | 7/2014 | Morgan | C08J 11/04 209/552 |
| 2014/0337145 | A1 * | 11/2014 | Phung | G06Q 30/0277 705/14.73 |
| 2015/0088620 | A1 * | 3/2015 | Wittek | G06Q 30/0207 705/14.1 |
| 2015/0154568 | A1 * | 6/2015 | Gu | G06Q 10/30 705/308 |
| 2016/0052690 | A1 * | 2/2016 | Bolhous | B65D 33/00 383/105 |
| 2017/0116569 | A1 * | 4/2017 | Cloud | G06Q 10/0833 |
| 2017/0124643 | A1 * | 5/2017 | Haimi | G06K 19/06009 |
| 2019/0333028 | A1 * | 10/2019 | Kucukseyhan, Jr. | G06Q 10/30 |
| 2020/0342487 | A1 * | 10/2020 | Greenberger | G06K 19/0776 |
| 2021/0012605 | A1 * | 1/2021 | Yamine | G07F 7/06 |
| 2021/0188541 | A1 * | 6/2021 | Kurani | B65F 1/14 |
| 2021/0272074 | A1 * | 9/2021 | Peacemaker | G06Q 10/30 |
| 2021/0365900 | A1 * | 11/2021 | Fedyski | G06Q 10/30 |

OTHER PUBLICATIONS

Paul Hiebert. "Consumer Demand for Better Packaging Might Just Save the Planet." (Jan. 17, 2020). Retrieved online Nov. 17, 2022. https://www.adweek.com/commerce/loop-sustainability-consumer-demand-better-product-packaging-save-the-planet/ (Year: 2020).*

ET2C. "Innovative Packaging Trends: Reuse or Recycle?" (Jun. 18, 2019). Retrieved online Nov. 17, 2022. https://et2c.com/innovative-packaging-trends-reuse-or-recycle/ (Year: 2019).*

* cited by examiner

METHODS AND SYSTEMS FOR REWARDING RECYCLING OF CONTAINERS AND COLLECTING CONTAINER METRICS

BACKGROUND

This disclosure relates generally to linking cardholders to products and containers of the products during a payment transaction, and more specifically, to providing rewards to cardholders when the containers linked to the cardholders are recycled and collecting container metric data associated with the recycled containers.

Many containers of products can be recycled. For example, if the containers are made out of glass (e.g., glass bottles), plastic (e.g., plastic bottles, plastic storage containers, plastic boxes, etc.), and/or paper/cardboard (e.g., boxes includes shipping boxes and storage boxes), the containers can generally be recycled at typical recycling facilities. However, if users want to get rewarded for recycling the containers, the users have to go through complex and time-consuming processes. In known recycling rewards systems, users either have to (i) take the containers directly to the recycling facility or (ii) manually scan (e.g., through a mobile application) each container of products bought by the user to collect a reward. These complex and time-consuming processes lead to fewer recyclable containers actually being recycled by users.

Further, in known systems, it is difficult for merchants and manufacturers to collect container metric data after the product and associated container have been purchased by users. For example, merchants and manufacturers may be unable to determine the time period that products and containers are in use before being disposed of by users, and the merchants and manufacturers may have to rely on customer input (e.g., through customer surveys) to determine the container metric data.

Accordingly, there is a need for systems and methods that reward users for recycling containers of products and determine container metric data with minimal effort required by users.

BRIEF DESCRIPTION

In one aspect, a computing system for linking products and containers to cardholders is provided. The computing system includes at least one processor including at least one memory device. The at least one processor is programmed to receive transaction data associated with a transaction carried out by a cardholder. The transaction data includes an account identifier associated with the cardholder, a product identifier, and a container identifier associated with a product purchased in the transaction. The at least one processor is also programmed to link the product identifier and the container identifier to the account identifier, and store, in the at least one memory device, the linked product identifier, container identifier, and account identifier. The at least one processor is further programmed to receive, from a user device, the container identifier associated with the container received by a user associated with the user device. The user is associated with recycling the container. The at least one processor is also programmed to determine the account identifier linked to the container identifier associated with the product received by the user, and automatically provide a reward to the cardholder via the account identifier.

In another aspect, a computer-implemented method for linking products to customers for recycling is provided. The method is implemented by a computer system including at least one processor in communication with at least one memory device. The method includes receiving transaction data associated with a transaction carried out by a cardholder. The transaction data includes an account identifier associated with the cardholder, a product identifier, and a container identifier associated with a product purchased in the transaction. The method also includes linking the product identifier and the container identifier to the account identifier, and storing, in the at least one memory device, the linked product identifier, container identifier, and account identifier. The method further includes receiving, from a user device, the container identifier associated with the container received by a user associated with the user device. The user is associated with recycling the container. The method also includes determining the account identifier linked to the container identifier associated with the product received by the user, and automatically providing a reward to the cardholder via the account identifier.

In yet another aspect, a non-transitory computer-readable storage medium having computer-executable instructions embodied thereon is provided. When executed by a computer system including at least one processor in communication with at least one memory device, the computer-executable instructions cause the at least one processor to receive transaction data associated with a transaction carried out by a cardholder. The transaction data includes an account identifier associated with the cardholder, a product identifier, and a container identifier associated with a product purchased in the transaction. The computer-executable instructions also cause the at least one processor to link the product identifier and the container identifier to the account identifier, and store, in the at least one memory device, the linked product identifier, container identifier, and account identifier. The computer-executable instructions also cause the at least one processor to receive, from a user device, the container identifier associated with the container received by a user associated with the user device. The user is associated with recycling the container. The computer-executable instructions further cause the at least one processor to determine the account identifier linked to the container identifier associated with the product received by the user, and automatically provide a reward to the cardholder via the account identifier.

BRIEF DESCRIPTION OF THE DRAWINGS

FIG. 1 is a schematic diagram illustrating an example multi-party payment account system for enabling payment transactions with a product linking (PL) computing device for collecting transaction data from the payment transactions and linking products and associated containers purchased during the payment transactions to a cardholder.

FIG. 2 is a block diagram of an example embodiment of a product linking (PL) platform including the PL computing device shown in FIG. 1.

FIG. 3 is a data flow diagram showing an example flow of data within the PL platform of FIG. 2.

FIG. 4 is an example configuration of a client system shown in FIG. 2.

FIG. 5 is an example configuration of a server system such as the PL computing device shown in FIGS. 1 and 2.

FIG. 6 is a diagram of components of one or more example computing devices that may be used in the PL platform shown in FIG. 2.

FIG. 7 is a simplified diagram of an example method for linking products and associated containers purchased during payment transactions to a cardholder using the PL computing device of FIG. 2.

Figure 1:
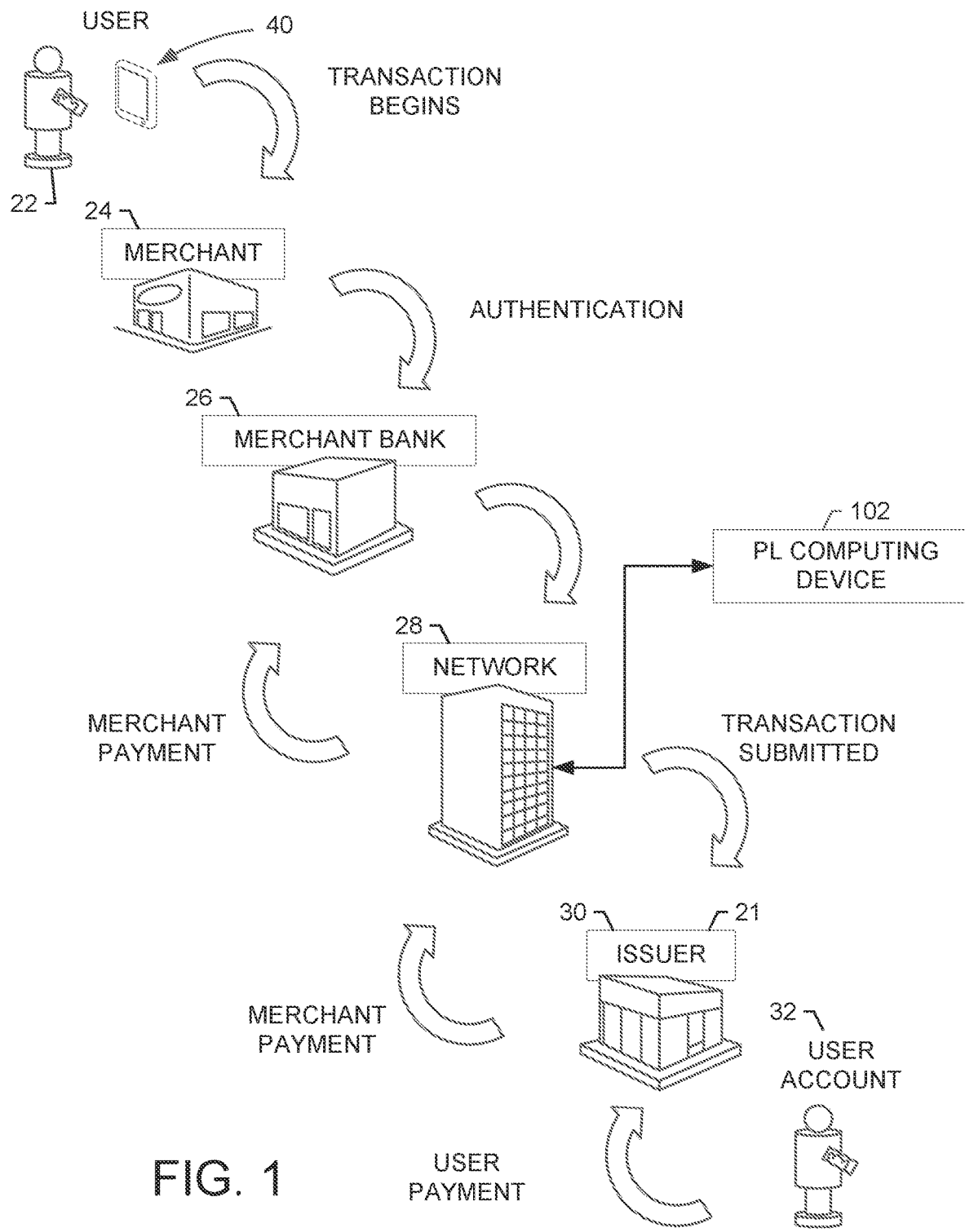
FIGS. 1-7 show exemplary embodiments of the method and system described herein.

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

The systems and methods described herein are directed to linking products and containers to cardholders when the cardholders purchase the products and associated containers. As used herein, a cardholder is purchaser of a product included within a container wherein the cardholder uses a payment card or payment account to initiate the purchase of the product. When the cardholders recycle the containers of the products, a reward is provided to the cardholders. Further, container metric data (e.g., a time period containers are in use before being recycled, a lifespan of the products associated with the containers, a list of users that interacted with each container, etc.) is generated for the recycled containers and may be used by merchants and/or manufacturers. In at least one example embodiment, the systems and methods described herein are implemented by a product linking (PL) computing device.

The PL computing device is in communication with a merchant device (either directly or indirectly through a payment processing network) associated with a merchant. The PL computing device receives transaction data after a cardholder initiates a transaction with the merchant. The transaction data includes a product identifier identifying the product purchased by the cardholder, a container identifier identifying the container of the product, and an account identifier associated with the cardholder. From the transaction data, the PL computing device links the account identifier with each container identifier and product identifier associated with the account identifier and the cardholder. Further, the PL computing device stores the linked data in a memory device (e.g., a database or other suitable storage device).

The PL computing device is also in communication with a user device associated with a user involved in the processing of recycled containers (e.g., a recycling facility, a mail carrier, a recycling service, etc.). When the cardholder recycles one or more containers, the PL computing device receives a recycled container identifier from the user device. The PL computing device determines (e.g., through a lookup of the memory device) the cardholder associated with the recycled container identifier and provides a reward for the determined cardholder. The reward is, for example, a payment card credit, a prepaid card, a merchant gift card, coupons, a digital wallet credit, cryptocurrency, and a check.

Further, since the PL computing device receives transaction data when products and containers are purchased and container identifiers when the containers are recycled, the PL computing device is able to determine unique container metrics. For example, the PL computing device can determine a time period that each container is in use before the containers are recycled, a lifespan of each product associated with each container, and a list of users that interacted with each container.

Since the PL computing device is in communication with both merchant devices and user devices, cardholders do not have to alter their purchasing and recycling habits to be rewarded for recycling containers. The PL computing device links the containers to the cardholders when the cardholders purchase the products of the containers (e.g., without the cardholders necessarily having to scan the containers separately). Further, the PL computing device receives recycled container identifiers from the recycler users and looks up the recycled container identifiers to identify the cardholder associated with the recycled container identifiers. Therefore, the cardholders can recycle containers as they normally do (e.g., curbside pickup, placing the containers in private or public recycling containers, etc.), and the cardholders do not necessarily have to scan purchased containers or physically bring the containers to a recycling facility or recycle drop-off to be linked to the containers and rewarded for recycling the containers. Accordingly, the PL computing device promotes recycling because cardholders are rewarded for recycling containers without changing their recycling habits.

The technical problems addressed by the disclosure include at least one of: (i) inability to link specific products and containers associated with the products to users at a point of purchase, (ii) inability to track metrics of containers after the containers have been purchased, and (iii) lack of a system that incentivizes recycling without requiring additional input or effort from users.

The resulting technical benefits achieved by the systems and methods of the disclosure include at least one of: (i) linking specific products and containers associated with the products to users at a point of purchase, (ii) tracking container metrics after the containers have been purchased, (iii) incentivizing users to recycle without requiring user input and/or additional effort from users, and (iv) increased recycling from users due to the users being rewarded for recycling.

The systems and methods of the disclosure are implemented using computer programming or engineering techniques including computer software, firmware, hardware, or any combination or subset thereof, wherein the technical effects are achieved by: (a) receiving transaction data associated with a transaction carried out by a cardholder, wherein the transaction data includes an account identifier associated with the cardholder, a product identifier, and a container identifier associated with a product purchased in the transaction; (b) linking the product identifier and the container identifier to the account identifier; (c) storing, in the at least one memory device, the linked product identifier, container identifier, and account identifier; (d) receiving, from a user device, the container identifier associated with the container received by a user associated with the user device, wherein the user is associated with recycling the container; (e) determining the account identifier linked to the container identifier associated with the product received by the user; and (f) automatically providing a reward to the cardholder via the account identifier.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "cardholder" may refer to the owner or rightful possessor of a payment card. As used herein, the term "cardholder account" may refer specifically to a primary account number (PAN) or more generally to an account a cardholder has with the payment card issuer and that the PAN is or was associated with. As used herein, the term "merchant" may refer to a business, a charity, or any other such entity that can generate transactions with a cardholder account through a payment card network.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 illustrates a schematic diagram of an example multi-party payment account system for enabling payment transactions initiated by cardholders with a product linking (PL) computing device 102 for collecting transaction data from the payment transactions and linking products and associated containers purchased during the payment transactions to a cardholder or user 22. Embodiments described herein may relate to a transaction card system, such as a payment card payment system using the Mastercard interchange network. The Mastercard interchange network is a set of proprietary communications standards promulgated by Mastercard International Incorporated for the exchange of financial transaction data and the settlement of funds between financial institutions that are members of Mastercard International Incorporated. (Mastercard is a registered trademark of Mastercard International Incorporated located in Purchase, New York).

In the exemplary embodiment, a financial institution called the "issuer" or "issuing bank" issues an account, such as a credit card account, to cardholder 22, who uses the account to tender payment for a purchase from a merchant 24. In one embodiment, cardholder 22 presents a payment card and/or a digital wallet to merchant 24 using a user computing device (also known as card-present transactions). In another embodiment, the user does not present a digital wallet and instead performs a card-not-present transaction. For example, the card-not-present transaction may be initiated via a digital wallet application, through a website or web portal, via telephone, or any other method that does not require the user to present a physical payment card to merchant 24 (e.g., via swiping the payment card and/or scanning the digital wallet).

To accept payment with the transaction card, merchant 24 establishes an account with a financial institution that is part of the financial payment system. This financial institution is usually called the "merchant bank," the "acquiring bank," or the "acquirer." In one embodiment, cardholder 22 tenders payment for a purchase using a transaction card at a transaction processing device 40 (e.g., a point of sale device), then merchant 24 requests authorization from a merchant bank 26 for the amount of the purchase. The request is usually performed through the use of a point-of-sale terminal, which reads account information of cardholder 22 from a magnetic stripe, a chip, barcode, or embossed characters on the transaction card (e.g., a digital wallet) and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether an account 32 of cardholder 22 is in good standing and whether the purchase is covered by an available credit line of cardholder 22. Based on these determinations, the request for authorization will be declined or accepted. If the request is accepted, an authorization code is issued to merchant 24.

When a request for authorization is accepted, the available credit line of account 32 of cardholder 22 is decreased. Normally, a charge for a payment card transaction is not posted immediately to account 32 of cardholder 22 because certain rules do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase in a database 106 (shown in FIG. 2).

After a purchase has been made, a clearing process occurs to transfer additional digital wallet data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, user account information, a type of transaction, information regarding the purchased item(s) (e.g., product identifiers), information regarding container(s) of the purchased item(s) (e.g., container identifiers), and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among account of merchant 24, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, cardholder 22, merchant 24, merchant bank 26, interchange network 28 (also referred to herein as payment processor 28), issuer bank 30, and/or an issuer processor 21.

In the exemplary embodiment, PL computing device 102 is communicatively coupled to interchange network computing device 28. PL computing device 102 is configured to receive transaction data from interchange network computing device 28 to link cardholder 22 with products purchased in the payment transaction and containers associated with the products. As described further herein, PL computing device 102 may additionally or alternatively be communicatively coupled to one or more computing devices of merchants 24 and/or of cardholder 22.

Figure 2:
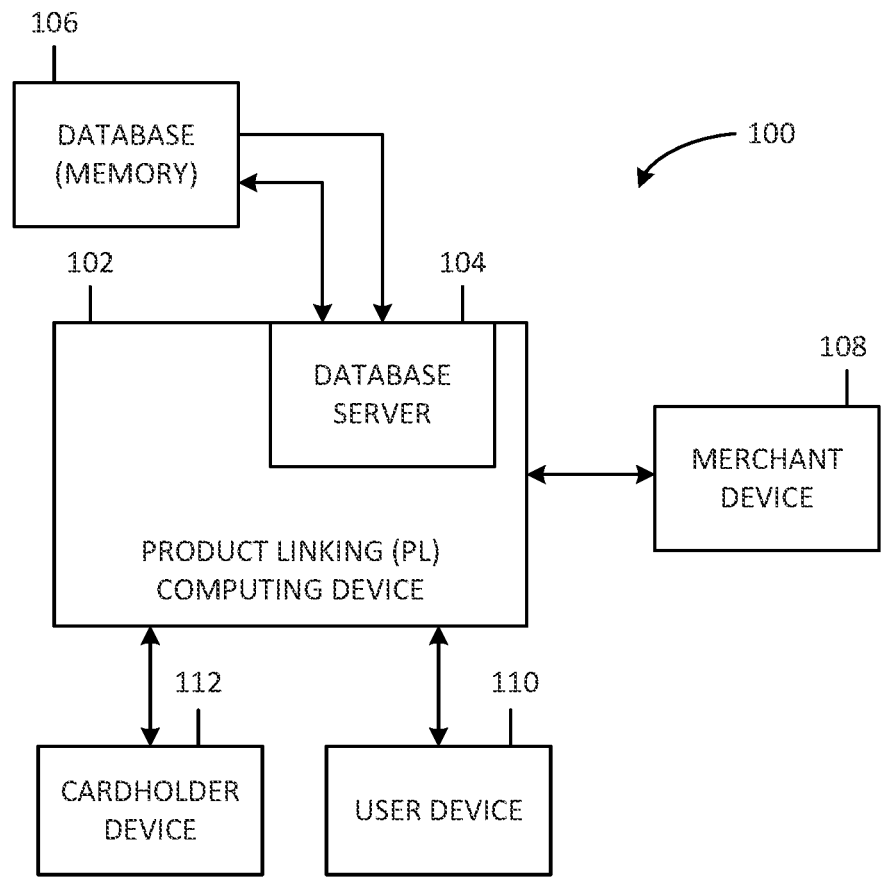

FIG. 2 is an expanded block diagram of an example embodiment of a product linking (PL) platform 100 used in processing payment transactions that includes product linking (PL) computing device 102 in accordance with one example embodiment of the present disclosure. In the example embodiment, PL platform 100 is used to link cardholders to products, and containers of the products, at a point of purchase and to provide rewards to the cardholders when the containers are recycled.

More specifically, in the example embodiment, PL platform 100 includes a PL computing device 102, and a plurality of client sub-systems connected to PL computing device 102. Client sub-systems include a merchant device 108 (also referred to as merchant computing device 108 and merchant system 108), a user device 110 (also referred to as user computing device 110 and user system 110), and a cardholder device 112 (also referred to as cardholder computing device 112 and cardholder system 112). In one embodiment, client sub-systems 108, 110, and 112 are computers including a web browser, such that PL computing device 102 is accessible to client sub-systems 108, 110, and 112 using the Internet and/or using a network. Client sub-systems 108, 110, and 112 are interconnected to the Internet through many interfaces including a network, such as a local area network (LAN) or a wide area network (WAN), dial-in-connections, cable modems, special high-speed Integrated Services Digital Network (ISDN) lines, and RDT networks. Merchant device 108 includes systems associated with merchants 24 (shown in FIG. 1) as well as external systems used to store data. For example, merchant system 108 may be a POS device communicatively coupled to an external system of merchants 24. User devices 110 include systems associated with users (e.g., users associated with recycling containers including recycling centers, post offices, etc.) as well as external systems used to store data. Cardholder devices 112 include systems associated with cardholders 22 (shown in FIG. 1) as well as external systems used to store data. PL computing device 102 is also in communication with a payment network server associated with interchange network 28 using the network, as shown in FIG. 1. Further, client sub-systems 108, 110, and 112 may additionally communicate with interchange network 28 using the network. Client sub-systems 108, 110, and 112 could be any device capable of interconnecting to the Internet including a web-based phone, PDA, or other web-based connectable equipment.

A database server 104 is connected to database 106, which contains information on a variety of matters, as described below in greater detail. In one embodiment, centralized database 106 is stored on PL computing device 102 and can be accessed by potential users at one of client sub-systems 108, 110, and 112 by logging onto PL computing device 102 through one of client sub-systems 108, 110, and 112. Access to centralized database 106 is controlled by PL computing device 102 to limit the display of data to authorized users enrolled with PL computing device 102. In an alternative embodiment, database 106 is stored remotely from PL computing device 102 and may be non-centralized. Database 106 may be a database configured to store information used by PL computing device 102 including, for example, transaction data, user data, cardholder data, merchant identifiers, merchant category codes, merchant locations, transaction amounts, product information (including, but not limited to, product identifiers), container information (including, but not limited to, container identifiers, container dimensions, container materials, and container metrics), reward data, a database of user login information, and/or other data.

Database 106 may include a single database having separated sections or partitions, or may include multiple databases, each being separate from each other. In some embodiments, database 106 stores transaction data generated over the processing network including data relating to merchants, consumers, account holders, prospective customers, issuers, acquirers, and/or purchases made. In some further embodiments, database 106 stores transaction data generated over a payment processing network server different from interchange network 28. In additional embodiments, database 106 also stores account data including at least one of a cardholder name, a cardholder address, one or more primary account numbers (PANs), other account identifiers, and transaction information. Database 106 may also store merchant information including a merchant identifier that identifies each merchant registered to use the network, and instructions for settling transactions including merchant bank account information. Database 106 may also store purchase data associated with items being purchased by a cardholder from a merchant, and authorization request data.

PL computing device 102 may be supported by interchange network 28 and/or may process transaction data. Cardholder devices 112 may be associated with a cardholder (e.g., cardholder 22) who enrolls in a product linking service associated with PL computing device 102. In other embodiments, PL computing device 102 may automatically enroll the cardholder in the product linking service.

Figure 3:
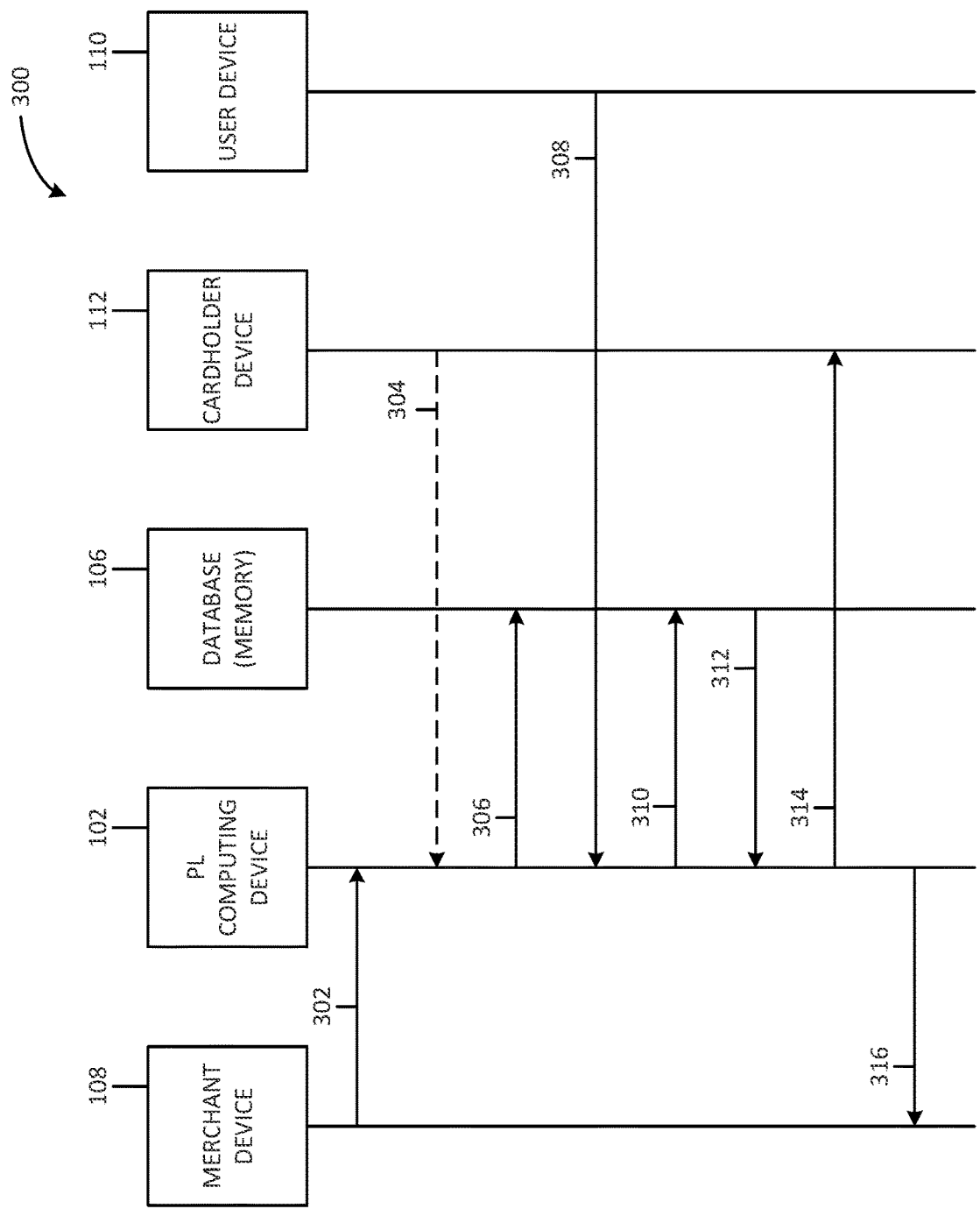

FIG. 3 is a data flow diagram 300 illustrating an example flow of data within the PL platform 100 of FIG. 2 including linking products and containers to cardholders at a point of purchase, providing rewards to cardholders when the linked containers are recycled, and providing container metrics to merchants.

Product linking (PL) computing device 102 receives transaction data 302 associated with cardholder 22 (shown in FIG. 1) from merchant device 108 (e.g., associated with merchant 24, shown in FIG. 1) after cardholder 22 initiates a transaction with merchant 24. In some embodiments, PL computing device 102 receives transaction data 302 directly from merchant device 108. In other embodiments, PL computing device 102 may receive transaction data 302 from merchant device 108 indirectly by receiving transaction data 302 from interchange network 28 (shown in FIG. 1). In one embodiment, PL computing device 102 receives transaction data 302 each time cardholder 22 completes a purchase with merchant 24. In another embodiment, PL computing device 102 receives transaction data 302 in bulk at predetermined time periods (e.g., every 24 hours) from interchange network 28 and/or merchant device 108.

Transaction data 302 includes an account identifier (e.g., a payment account number like a credit card number or a debit card number) associated with the cardholder and a product identifier and a container identifier associated with each product purchased in the transaction. The product identifier may include any information identifying the product purchased by cardholder 22 including, for example, manufacturer, brand, item number, product number, product description, etc. The container identifier may include a quick response (QR), a bar code including a stock keeping unit (SKU), or any other identifier that identifies the container of the product. Additionally or alternatively, cardholder 22 may use cardholder device 112 to scan container identifiers 304 associated with cardholder 22, and cardholder device 112 may transmit container identifiers 304 associated with cardholder 22 to PL computing device 102.

PL computing device 102 utilizes received transaction data 302 and/or received container identifiers 304 to link cardholder 22 with purchased products and the containers of the products. That is, when PL computing device 102 receives transaction data 302 and/or container identifiers 304, PL computing device 102 links cardholder 22 with each product and product container purchased by cardholder 22. PL computing device 102 links products and containers to cardholder 22 using the account identifier associated with cardholder 22 included in transaction data 302. PL computing device 102 stores linked cardholders, product identifiers, and container identifiers 304 in database 106, or any other suitable memory device, associated with PL computing device 102. That is, PL computing device 102 stores the product identifiers and container identifiers associated with each account identifier (and therefore each cardholder 22).

When a container is recycled by cardholder 22, a user processes the container to be reused or recycled. The user is associated with user device 110 and is, for example, a recycling facility or a merchant or manufacturer associated with recycling/reusing the container. In the exemplary embodiment, cardholder 22 can recycle containers through whichever method cardholder 22 normally recycles containers (e.g., putting the containers in a recycle bin to be picked up by a waste management vehicle, bringing the containers to recycling facilities, etc.). That is, cardholder 22 does not have to change current recycling habits or routines to be rewarded for recycling, as described further herein. Further, in known recycling systems, users generally scan container identifiers (e.g., barcodes, QR codes, SKUs, etc.) to properly recycle the containers. For example, container identifiers may include the container material, and therefore, when the container identifiers are scanned, the user can properly sort and recycle the container based upon the container material. Since PL computing device 102 is integrated with user device 110, the users also do not have to alter the typical recycling process to be in accordance with the systems and methods described herein. Accordingly, when user device 110 processes the recycled containers (e.g., scans a barcode, QR code, SKU, etc. of the recycled container), user device 110 transmits recycled container identifiers 308 to PL computing device 102.

To determine cardholders 22 associated with received recycled container identifiers 308, PL computing device 102 transmits a query 310 to database 106 to determine cardholder 22 linked to recycled container identifiers 308. For example, query 310 includes recycled container identifiers 308, and PL computing device 102 performs a lookup in database 106 to determine the account identifiers (and therefore cardholders 22) linked to recycled container identifiers 308. In response to query 310, PL computing device 102 receives a response 312 including linked cardholders 22 associated with recycled container identifiers 308.

Once cardholders 22 associated with recycled container identifiers 308 are determined, PL computing device 102 transmits a reward 314 to cardholder devices 112 associated with cardholders 22 to reward cardholders 22 for recycling the container. In some embodiments, recycled container identifiers 308 identify the container makeup (e.g., dimensions of the container, material of the container, etc.), and reward 314 is based upon the container makeup. For example, recycling a glass jar may be associated with a higher reward 314 than reward 314 for recycling a plastic bottle. Reward 314 includes payment card credit, a prepaid card, a merchant gift card, coupons, cryptocurrency, digital wallet credits, and/or a check. PL computing device 102 may also provide an additional reward 314 to cardholder device 112 for scanning container identifiers 304.

Further, when recycled container identifiers 308 are received, PL computing device 102 determines container metrics 316 of the containers associated with recycled container identifiers 308. Container metrics 316 include a time period that each container is in use before the container is recycled, a lifespan of each product associated with each container, and a list of users that interacted with each container. PL computing device 102 determines container metrics 316 from received transaction data 302 when the containers are purchased and received recycled container identifiers 308 when the containers are recycled. Container metrics 316 are sent to merchant device 108 for use by merchant 24 and/or a manufacturer of the container. For example, container metrics 316 may be analyzed by merchant 24 and/or the manufacturer to improve containers, the manufacturing of containers, the container makeup of containers, etc. based upon how the containers are used. For example, container metrics 316 may show that a certain container is generally only used once and has a very short time period of use. Accordingly, merchants 24 and manufacturers may change a design of the container such that the container is better suited for short, one-time uses.

For example, in one embodiment, a plastic water bottle is purchased by a cardholder at a merchant. Transaction data 302 is sent to PL computing device 102 from merchant device 108 including a product identifier (e.g., the water bottle brand), a container identifier (e.g., a SKU of the water bottle), and an account identifier associated with the cardholder (e.g., a credit card number). PL computing device 102 links the account identifier associated with the cardholder with the product identifier and the container identifier and stores linked data 306 in database 106. When the cardholder recycles the plastic water bottle (e.g., by putting the water bottle in a public or private recycling bin or bringing the water bottle to a recycling facility), a user device (e.g., associated with the recycling facility that processes the recycled water bottle) sends recycled container identifier 308 to PL computing device 102. PL computing device 102 performs a lookup (e.g., a query 310) of database 106 to determine the cardholder associated with the water bottle and transmits reward 314 to cardholder device 112 associated with the cardholder. Since the recycled container is a plastic water bottle (as determined from recycled container identifier 308), PL computing device 102 may determine that reward 314 for the cardholder is, for example, 5 cents. Further, PL computing device 102 determines container metrics 316 for the water bottle. For example, PL computing device 102 may determine that a time period that the water bottle was in use is the time period between PL computing device 102 receiving transaction data 302 associated with the water bottle and PL computing device 102 receiving recycled container identifier 308 associated with the water bottle.

Figure 4:
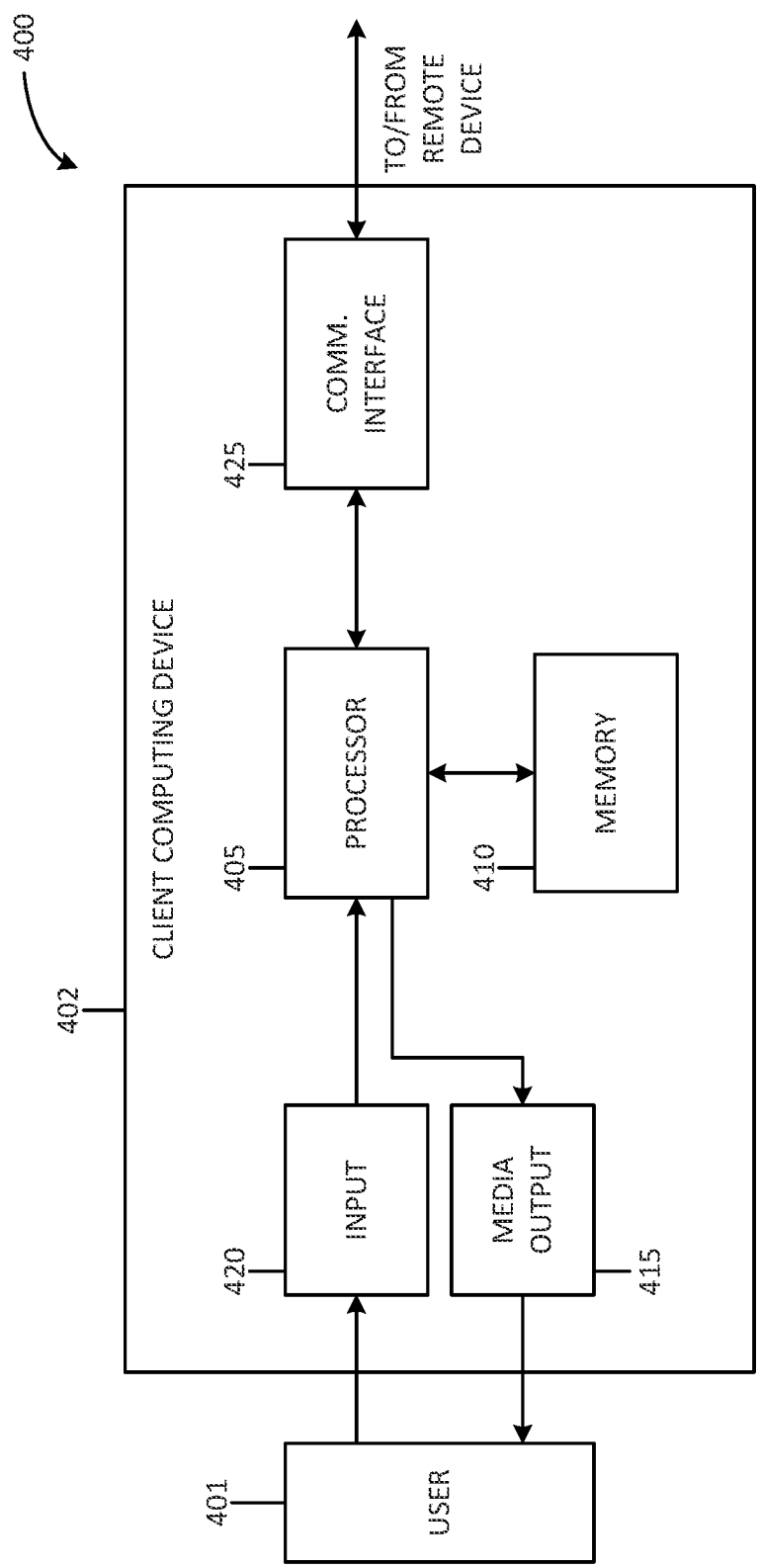

FIG. 4 illustrates an example configuration of a client computing device 402. Client computing device 402 may include, but is not limited to, merchant devices 108, user devices 110, and cardholder devices 112 (shown in FIG. 1). Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 22). Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively couplable to a remote device such as a server system (e.g., server system 501 shown in FIG. 5) or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application associated with, for example, a merchant. The user interface, via one or both of a web browser and a client application, facilitates displaying rewards and other information related to recycling containers by PL computing device 102. The user may interact with the user interface to view and explore the rewards and data, for example, by selecting to view historic rewards using input device 420 and viewing analytics associated with same.

Figure 5:
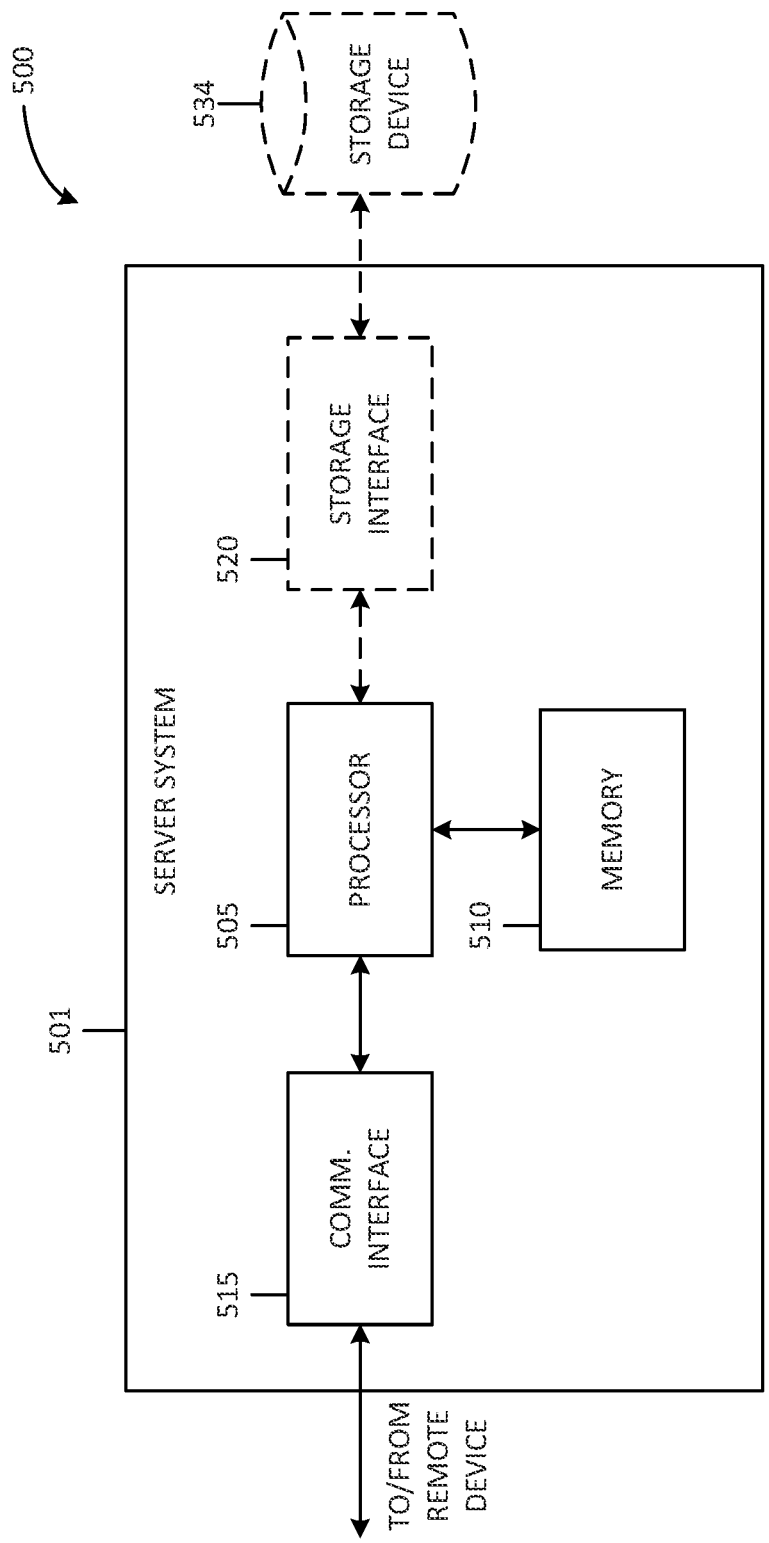

FIG. 5 illustrates an example configuration of a server (host computing device) system 501 such as PL computing device 102 (shown in FIG. 2) used to receive transaction data, link products and containers associated with the products to cardholder using the transaction data and/or container data from the cardholder, determine that containers linked to the cardholder have been recycled, provide rewards to the cardholder for recycling the containers, and/or provide container metrics to a merchant associated with the container, in accordance with one example embodiment of the present disclosure.

Server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that server system 501 is capable of communicating with a remote device such as a user system or another server system 501. For example, communication interface 515 may receive requests (e.g., requests to display analytics and/or provide an interactive user interface) from a client sub-system 108, 110, and/or 112 via the Internet, as illustrated in FIG. 2.

Processor 505 may also be operatively coupled to a storage device 534. Storage device 534 is any computer-operated hardware suitable for storing and/or retrieving data. In some embodiments, storage device 534 is integrated in server system 501. For example, server system 501 may include one or more hard disk drives as storage device 534. In other embodiments, storage device 534 is external to server system 501 and may be accessed by a plurality of server systems 501. For example, storage device 534 may include multiple storage units such as hard disks or solid state disks in a redundant array of inexpensive disks (RAID) configuration. Storage device 534 may include a storage area network (SAN) and/or a network attached storage (NAS) system. In some embodiments, server system 501 also includes database server 104 (shown in FIG. 2).

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
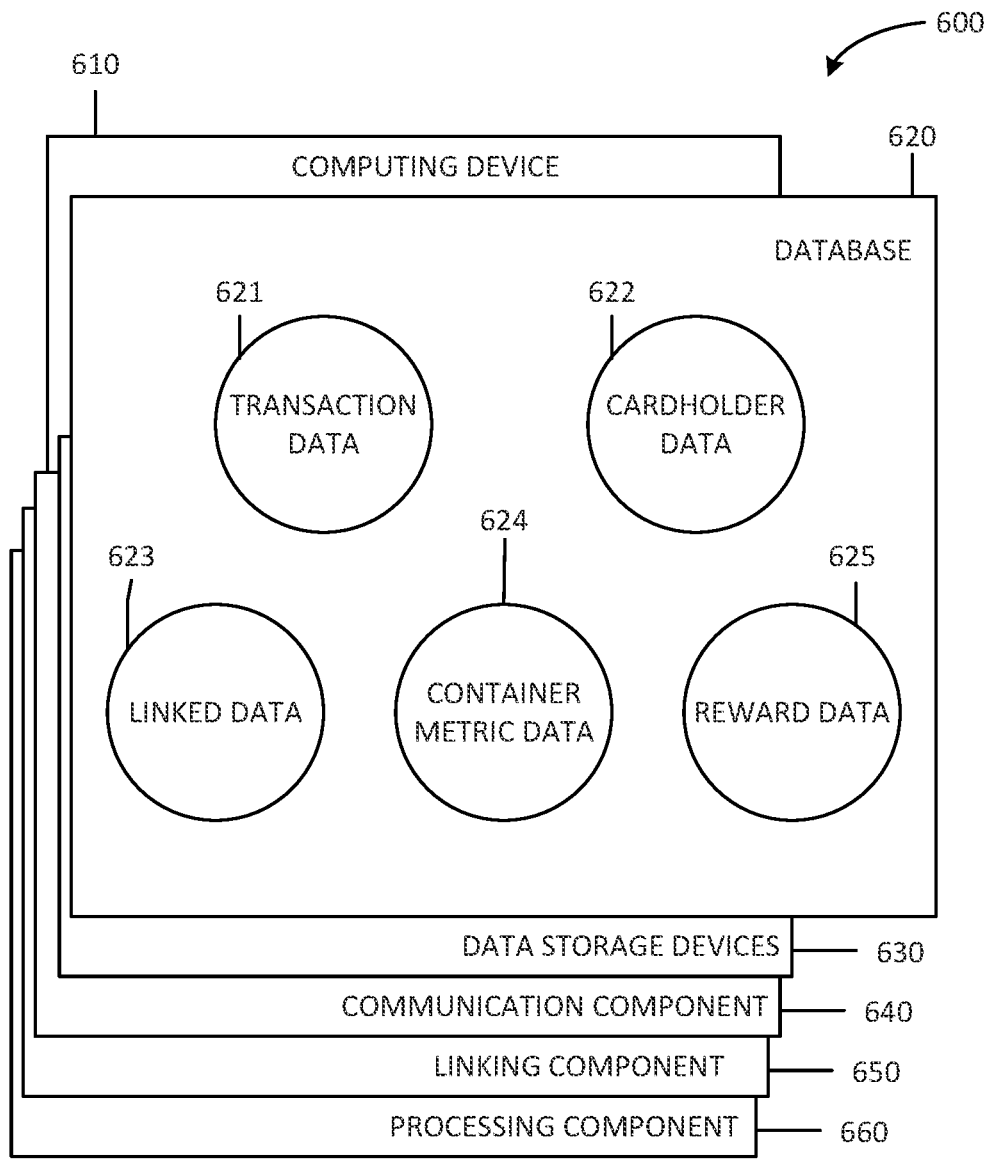

FIG. 6 is a diagram of components 600 of one or more example computing devices 610 (e.g., PL computing device 102) that may be used in the environment shown in FIG. 2. Computing device 610 includes database 620 as well as data storage devices 630, a communication component 640, a linking component 650, and a processing component 660. Database 620 may store information such as, for example, transaction data 621, cardholder data 622 (e.g., information regarding accounts of cardholders and preferred rewards of cardholders), linked data 623, container metric data 624, reward data 625, and/or other data. Transaction data 621 is data related to transactions processed by one or more payment processing networks. Database 620 is coupled to several separate components within PL computing device 102, which perform specific tasks. In some embodiments, database 620 is substantially similar to database 106 (shown in FIG. 2).

Communication component 640 facilitates communication between computing device 610 and client sub-systems (e.g., merchant devices 108, user devices 110, and cardholder devices 112, as shown in FIG. 2). Linking component 650 is used to link cardholders with products and product containers associated with the cardholders (e.g., as purchased or otherwise obtained by the cardholders). Processing component 660 processes transaction data, container metric data, rewards.

Figure 7:
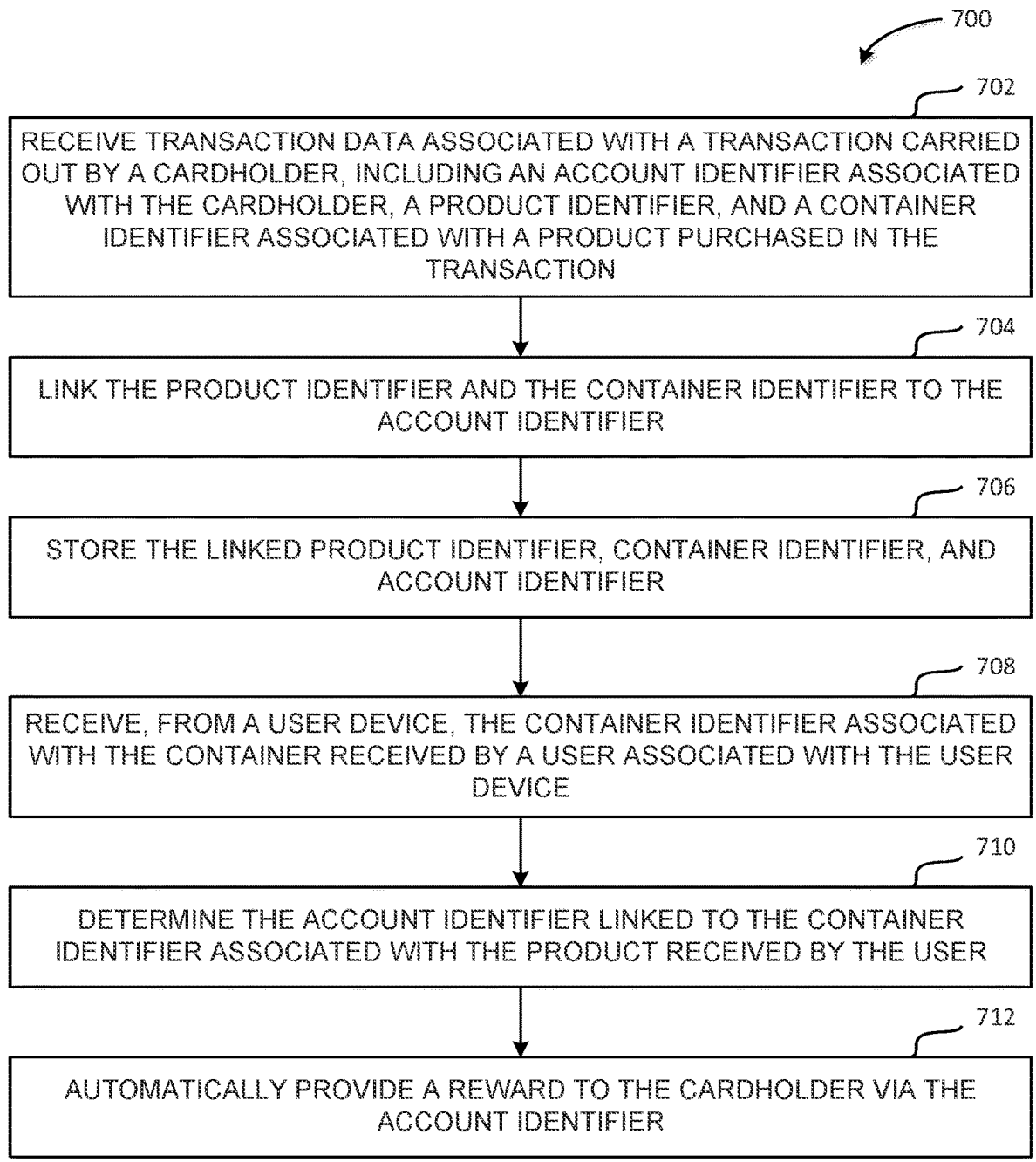

FIG. 7 illustrates a flow chart of an exemplary method 700 for linking cardholders to products and product containers for recycling. Method 700 may be carried out by product linking (PL) computing device 102 (shown in FIG. 2).

In the example embodiment, method 700 includes receiving 702 transaction data associated with a transaction carried out by a cardholder. The transaction data includes an account identifier associated with the cardholder, a product identifier, and a container identifier associated with a product purchased in the transaction. Method 700 also includes linking 704 the product identifier and the container identifier to the account identifier, and storing 706 the linked product identifier, container identifier, and account identifier.

Method 700 also includes receiving 708, from a user device, the container identifier associated with the container received by a user associated with the user device. The user is associated with recycling the container. Method 700 further includes determining 710 the account identifier linked to the container identifier associated with the product received by the user, and automatically providing 712 a reward to the cardholder via the account identifier.

Method 700 may include additional, fewer, and/or alternative steps. For example, in some embodiments, method 700 also includes prompting the cardholder to scan, through a cardholder device associated with the cardholder, one of the product identifier and the container identifier associated with the product purchased by the cardholder, and providing a further reward to the cardholder for scanning the one of the product identifier and the container identifier.

In some embodiments, the container identifier includes container makeup, including dimensions of the container and material of the container. In such embodiments, method 700 further includes determining the reward to provide to the cardholder based upon the container makeup.

In some embodiments, method 700 includes determining container metrics associated with the container received by the user. The container metrics include how long the container was in use before the container was recycled, a lifespan of the product associated with the container, and a list of users that interacted with the container.

In some embodiments, automatically providing 712 includes providing the rewarding in a form of at least one of a payment card credit, a prepaid card, a merchant gift card, coupons, a digital wallet credit, cryptocurrency, and a check.

In some embodiments, receiving 702 includes receiving the transaction data from at least one of a merchant computing device and a payment processor.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the verification computing module are described herein as including general processing and memory devices, it should be understood that the verification computing module is a specialized computer configured to perform the steps described herein for verifying operation of payment terminals and payment processing networks.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A computing system for linking products and containers to cardholders, the computing system in communication with a payment processing network and a user device of a recycling facility, the computing system including at least one processor including at least one memory device, the at least one processor programmed to:
   receive, from the payment processing network, transaction data to process a transaction associated with the transaction data, wherein the transaction is carried out by a cardholder to purchase a product, wherein the transaction data includes an account identifier associated with the cardholder, a product identifier associated with the purchased product, and a container identifier associated with the purchased product, and wherein the payment processing network implements a proprietary communications standard for exchange of transaction information and settlement of funds between institutions that are members of the payment processing network;
   in response to receiving the transaction data, link the product identifier and the container identifier to the account identifier;
   store, in the at least one memory device, the linked product identifier, container identifier, and account identifier;
   receive, from a scanning apparatus of the user device of the recycling facility, the container identifier of the container associated with the purchased product in response to the container identifier being scanned by the user device of the recycling facility;
   perform a lookup in the at least one memory device to determine the account identifier linked to the received container identifier; and
   automatically provide a reward to the cardholder associated with the linked account identifier.

2. The computing system of claim 1, wherein the at least one processor is further programmed to:
   prompt the cardholder to scan, through a cardholder device associated with the cardholder, one of the product identifier and the container identifier associated with the product purchased by the cardholder; and
   provide a further reward to the cardholder for scanning the one of the product identifier and the container identifier.

3. The computing system of claim 1, wherein the container identifier includes container makeup, including dimensions of the container and material of the container, and wherein the at least one processor is further programmed to:

determine the reward to provide to the cardholder based upon the container makeup.

4. The computing system of claim 1, wherein the at least one processor is further programmed to:
determine container metrics associated with the container received by the user device of the recycling facility, wherein the container metrics include how long the container was in use before the container was recycled, a lifespan of the product associated with the container, and a list of users that interacted with the container.

5. The computing system of claim 1, wherein the reward is in a form of at least one of a payment card credit, a prepaid card, a merchant gift card, coupons, a digital wallet credit, cryptocurrency, and a check.

6. The computing system of claim 1, wherein the transaction data is received from at least one of a merchant computing device and a payment processor.

7. The computing system of claim 1, wherein the recycling facility is at least one of a recycling center, a mail carrier picking up containers, and a recycling service.

8. A computer-implemented method for linking products to customers for recycling, the method implemented by a computer system in communication with a payment processing network and a user device of a recycling facility and including at least one processor in communication with at least one memory device, said method comprising:
receiving, from the payment processing network, transaction data to process a transaction associated with the transaction data, wherein the transaction is carried out by a cardholder to purchase a product, wherein the transaction data includes an account identifier associated with the cardholder, a product identifier associated with the purchased product, and a container identifier associated with the purchased product, and wherein the payment processing network implements a proprietary communications standard for exchange of transaction information and settlement of funds between institutions that are members of the payment processing network;
in response to receiving the transaction data, linking the product identifier and the container identifier to the account identifier;
storing, in the at least one memory device, the linked product identifier, container identifier, and account identifier;
receiving, from a scanning apparatus of the user device of the recycling facility, the container identifier of the container associated with the purchased product in response to the container identifier being scanned by the user device of the recycling facility;
performing a lookup in the at least one memory device to determine the account identifier linked to the received container identifier; and
automatically providing a reward to the cardholder associated with the linked account identifier.

9. The method of claim 8 further comprising:
prompting the cardholder to scan, through a cardholder device associated with the cardholder, one of the product identifier and the container identifier associated with the product purchased by the cardholder; and
providing a further reward to the cardholder for scanning the one of the product identifier and the container identifier.

10. The method of claim 8 wherein the container identifier includes container makeup, including dimensions of the container and material of the container, and wherein said method further comprises:

determining the reward to provide to the cardholder based upon the container makeup.

11. The method of claim 8 further comprising:
determining container metrics associated with the container received by the user device of the recycling facility, wherein the container metrics include how long the container was in use before the container was recycled, a lifespan of the product associated with the container, and a list of users that interacted with the container.

12. The method of claim 8, wherein automatically providing the reward comprises providing the reward in a form of at least one of a payment card credit, a prepaid card, a merchant gift card, coupons, a digital wallet credit, cryptocurrency, and a check.

13. The method of claim 8, wherein receiving the transaction data comprises receiving the transaction data from at least one of a merchant computing device and a payment processor.

14. A non-transitory computer-readable storage medium having computer-executable instructions embodied thereon, wherein when executed by a computer system in communication with a payment processing network and a user device of a recycling facility and including at least one processor in communication with at least one memory device, the computer-executable instructions cause the at least one processor to:
receive, from the payment processing network, transaction data to process a transaction associated with the transaction data, wherein the transaction is carried out by a cardholder to purchase a product, wherein the transaction data includes an account identifier associated with the cardholder, a product identifier associated with the purchased product, and a container identifier associated with the purchased product, and wherein the payment processing network implements a proprietary communications standard for exchange of transaction information and settlement of funds between institutions that are members of the payment processing network;
in response to receiving the transaction data, link the product identifier and the container identifier to the account identifier;
store, in the at least one memory device, the linked product identifier, container identifier, and account identifier;
receive, from a scanning apparatus of the user device of the recycling facility, the container identifier of the container associated with the purchased product in response to the container identifier being scanned by the user device of the recycling facility;
perform a lookup in the at least one memory device to determine the account identifier linked to the received container identifier; and
automatically provide a reward to the cardholder associated with the linked account identifier.

15. The computer-readable storage medium of claim 14, wherein the computer-executable instructions further cause the at least one processor to:
prompt the cardholder to scan, through a cardholder device associated with the cardholder, one of the product identifier and the container identifier associated with the product purchased by the cardholder; and
provide a further reward to the cardholder for scanning the one of the product identifier and the container identifier.

16. The computer-readable storage medium of claim 14, wherein the container identifier includes container makeup, including dimensions of the container and material of the container, and wherein the computer-executable instructions further cause the at least one processor to:

determine the reward to provide to the cardholder based upon the container makeup.

17. The computer-readable storage medium of claim 14, wherein the computer-executable instructions further cause the at least one processor to:

determine container metrics associated with the container received by the user device of the recycling facility, wherein the container metrics include how long the container was in use before the container was recycled, a lifespan of the product associated with the container, and a list of users that interacted with the container.

18. The computer-readable storage medium of claim 14, wherein the reward is in a form of at least one of a payment card credit, a prepaid card, a merchant gift card, coupons, a digital wallet credit, cryptocurrency, and a check.

19. The computer-readable storage medium of claim 14, wherein the transaction data is received from at least one of a merchant computing device and a payment processor.

20. The computer-readable storage medium of claim 14, wherein the recycling facility is at least one of a recycling center, a mail carrier picking up containers, and a recycling service.

\* \* \* \* \*